US009751379B2

(12) United States Patent
Weiss et al.

(10) Patent No.: US 9,751,379 B2
(45) Date of Patent: Sep. 5, 2017

(54) METHOD AND APPARATUS FOR COOLING A HEAT EXCHANGER IN A VEHICLE

(71) Applicant: Dr. Ing. h.c. F. Porsche Aktiengesellschaft, Stuttgart (DE)

(72) Inventors: Thomas Weiss, Tamm (DE); Jakob Weissert, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 369 days.

(21) Appl. No.: 14/485,863

(22) Filed: Sep. 15, 2014

(65) Prior Publication Data

US 2015/0079891 A1   Mar. 19, 2015

(30) Foreign Application Priority Data

Sep. 17, 2013   (DE) .................. 10 2013 110 204

(51) Int. Cl.
*B60H 1/00*          (2006.01)
*F01P 11/10*         (2006.01)

(52) U.S. Cl.
CPC .......... *B60H 1/00507* (2013.01); *F01P 11/10* (2013.01)

(58) Field of Classification Search
CPC ....... B60K 11/04; B60K 11/08; B60K 11/085; B60K 13/02; F02M 35/161

USPC ............ 454/152, 155; 180/68.3, 68.1; 123/184.35, 184.21, 184.47
See application file for complete search history.

(56) References Cited

U.S. PATENT DOCUMENTS 4,753,288 A * 6/1988 Harvey ................ B60K 11/085
                                                 123/41.04
8,474,557 B2 * 7/2013 Wolf .......................... B60T 5/00
                                                 180/68.1

FOREIGN PATENT DOCUMENTS

JP   2010-167901   8/2010

* cited by examiner

*Primary Examiner* — Avinash Savani
*Assistant Examiner* — Vivek Shirsat
(74) *Attorney, Agent, or Firm* — Gerald E. Hespos; Michael J. Porco; Matthew T. Hespos

(57) ABSTRACT

An air-guiding device (7) can be arranged in a wheel house of a motor vehicle and has a plurality of slats (12). Each slat (12) has at least one first region (11.1, 11.3) with a first profile and at least one second region (11.2, 11.4) with a second profile. The respective profile of the respective region (11) of the respective slat (12) is matched to the respective flow conditions present by a respective shaping and a respective angle of attack. Therefore an air stream approaching the slats (12) has to overcome a reduced aerodynamic drag when passing through the respective slats (12).

8 Claims, 2 Drawing Sheets

METHOD AND APPARATUS FOR COOLING A HEAT EXCHANGER IN A VEHICLE

CROSS REFERENCE TO RELATED APPLICATION

This application claims priority under 35 USC 119 to German Patent Application No. 10 2013 110 204.2, filed Sep. 17, 2013, the entire disclosure of which is incorporated herein by reference.

BACKGROUND OF THE INVENTION

1. Field of the Invention

The present invention relates to an apparatus and to a method for the optimized removal of air streams from a vehicle by an air-guiding device.

2. Description of the Related Art

Engines in vehicles frequently generate a high degree of waste heat that has to be removed to protect the engines from damage, for example due to overheating.

DD 222 553 A1 discloses an apparatus for cooling rail vehicles. The apparatus uses a spoiler to conduct an arriving air flow so that, after the passing through the apparatus, individual, uniform air jets arise. A virtually equalized, positive pressure field is generated upstream of the apparatus and provides an aerodynamic blocking effect for rain, snow and sand in a reverse direction of flow.

JP2010-167901 A provides an arrangement with six cooling fins to ventilate a brake rotor within a wheel. The cooling fins have a greater curvature with increasing proximity to the rear of the vehicle. The cooling fins function to blow air onto the brake rotor that brakes the wheel. Air flowing in through the cooling fins is bunched in the process and conducted as a cooling jet onto the brake rotor.

U.S. Pat. No. 8,474,557 discloses an air-guiding device configured so that air that cools a radiator is conducted away to the outside through respective wheel houses of the vehicle. Air-guiding slats surrounded by the air-guiding device are positioned differently so that part of the approaching air is conducted away to the environment around the vehicle and a further part is conducted to the inside of the vehicle by a deflecting blade and is used to cool a wheel brake.

SUMMARY OF THE INVENTION

The invention relates to an air-guiding device that can be arranged in a wheel house of a motor vehicle and comprises a plurality of slats. Each slat comprises at least one first region with a first profile and at least one second region with a second profile. The respective profile of the respective region of the respective slat is matched to the respective flow conditions present by means of a respective shaping and a respective angle of attack. Therefore an air stream approaching the slats has to overcome a reduced aerodynamic drag when passing through the respective slats.

Acceleration and speed of a vehicle depend, inter alia, on how much force in the form of aerodynamic drag the vehicle has to overcome to enable movement of the vehicle. The aerodynamic drag or coefficient of drag ($C_W$ value) of the vehicle depends, in turn, on how efficiently approaching air is conducted around the vehicle or through the vehicle or else through parts of the vehicle.

The air-guiding device permits an efficient, i.e. energy-saving, removal of air streams within a vehicle. For this purpose, air that is output by a heat exchanger, i.e. by a radiator, and is optionally accelerated by a fan and is in the form of an air stream is conducted through a ventilation duct to a respective wheel house that contains the air-guiding device of the invention. The air-guiding device surrounds slats that are shaped and oriented with respect to the air stream to permit an efficient transfer of the air stream from within the vehicle to the outside for keeping the aerodynamic drag as low as possible when the air stream exits through the air-guiding device.

The fan causes acceleration of the air stream. Thus, the air stream generally does not flow linearly, but rather flows turbulently. As a result, flow regions of different speeds and associated different aerodynamic properties form in the ventilation duct, and particularly in the region upstream of the air-guiding device of the invention. The respective aerodynamic properties cause different demands to be made of a respective profile of the slats that are provided for the transfer into the environment around the vehicle.

In the case of rather steep angles of attack, turbulent flows pass efficiently through the air-guiding device, linear flows exhibit an efficient flow behavior in the event of gentle angles of attack.

Within the context of the invention, an angle of attack should be understood as meaning the angle about which a slat is rotated about the longitudinal axis thereof. Furthermore, the angle of attack provides information about an angle between a direction of an approaching fluid and a chord of the respective profile of the respective regions of the respective slat. In accordance with the invention, the angle of attack of the respective profiles can change between the respective regions of the slat.

In accordance with the present invention, a profile should be understood as meaning a configuration, i.e. an outer shape of a region of a slat. It is conceivable for the slats to run both in the longitudinal direction and in the transverse direction and to be held in the positions thereof by one or more support elements.

The air-guiding device of the invention also can achieve a reduction of lift. Lift has a negative effect on the driving stability of the vehicle. As a result, the air-guiding device of the invention has a positive effect on the driving performance of the vehicle, in particular at high speed.

The air-guiding device of the invention may enable the air stream approaching the slats to be conducted out of the vehicle so that the air stream escapes as directly as possible from the wheel house. Thus, the air stream is not directed immediately onto a wheel that rotates in the wheel house and that would entrain the air and keep the air in the wheel house. Rather air is directed in a shallow manner past the wheel. As a result, both aerodynamic drag and lift of the vehicle are reduced. Furthermore, a positive pressure and therefore lift within the wheel house are reduced by the shallow discharging of the air.

Within the context of the invention, a wheel house is understood as meaning that part of a vehicle in which a respective wheel, in particular a front wheel, is arranged. The term wheel house here includes plastics inserts in wings of the vehicle, but without being restricted thereto.

Regions of each slat may have an arcuate or drop-shaped profile with a thick end and a thin end. The ends may be oriented in a manner corresponding to the respective flow conditions.

Parts with a thick profile preferably should be oriented to be approached by rather slow, linear flows, whereas turbulent flows pass through the parts having a thinner profile. Bending regions of the slats to define an arcuate, i.e. curved, water drop that tapers from thick to thin enables outlet openings that are optimized for flow conditions, and therefore enables an efficient transfer of the entire air stream out of the vehicle. The air stream flows off more rapidly and hence more efficiently into the environment in comparison to uniformly shaped outlet openings.

The air-guiding device may have at least one of the respective regions of a slat to have a profile with a gentle angle of attack, and at least one further region of said slat to have a profile with a steep angle of attack.

Slats of the air-guiding device may be configured so that dirt is prevented from entering the vehicle through the air-guiding device.

Wheel houses primarily function to prevent road topping accumulated by respective wheels, such as dirt and stones, from entering the vehicle interior. To continue to perform this function and nevertheless to provide air-guiding devices for an exchange of air between the vehicle interior and the environment, the slats of the air-guiding device of the invention are shaped to block a passage of particles, such as dirt, that may have been whirled up, counter to the flow direction.

The air-guiding device of the invention may be configured to discharge an air stream heated by a heat exchanger.

Heat exchangers in vehicles frequently are supplied with cooling air by fans. The heat exchangers and the associated fans are involved to a considerably extent in admitting air that is to be conducted away. Plural fans frequently are operated simultaneously. Thus, plural flows or flow layers with different flow properties are produced. The air-guiding device of the invention is configured so that profiles of the regions of the slats of the air-guiding device that are optimized for, i.e. matched to the respective flow properties are provided, and therefore the respective flows or flow layers are discharged efficiently from the vehicle.

Profiles of the respective regions of the slats may be matched to respective flow regions or flow layers of the air stream.

The profile of the respective regions of the slats may differ depending on a position of the heat exchanger.

Properties of the air stream caused by the heat exchanger or the fan connected to the heat exchanger change to due to a position of the heat exchanger. Thus, regions of the slats of the air-guiding device may be configured corresponding to the respective flow conditions. One possibility would be a shape matched to an installation side or a shape matched to a distance from the respective fan or fans, and therefore rapid, turbulent flows originating from a fan located close by are removed through large openings, i.e. by respective regions of the slats with a steep profile, i.e. a steep angle of attack, whereas slower flows supplied by a fan located further away are removed through rather narrower openings, i.e. by respective regions of the slats with a flat profile, i.e. a gentle angle of attack.

Regions of the slats may differ in the profile depending on a position and/or a shape of the respective wheel house.

The flow conditions in the respective wheel house have a great influence on a respective flow-off behavior of the air emerging through the air-guiding device of the invention. Thus, a respective configuration of the wheel house also requires a respective adapted shape of the air-guiding device. Thus, narrower wheel houses require, for example, longer air-guiding devices.

The invention also relates to a method for cooling a heat exchanger in a vehicle, in which an air stream heated by the heat exchanger is output to a respective environment by an air-guiding device with at least two regions having different slats and profiles configured with different angles of attack. The air-guiding device can be arranged in a wheel house of the vehicle.

The method of the invention functions for cooling vehicles at high speeds, in which inflowing air masses cause strong air flows that produce hazardous lift effects in the respective wheel houses. These lift effects are reduced by the method of the invention.

The method may comprise conducting at least part of the air stream into the wheel house in a manner for cooling a wheel brake in the wheel house.

A wheel brake in a respective wheel house is heated during use and may require cooling. Therefore, the invention may comprise conducting at least part of the air removed by the air-guiding device onto the wheel brake so that the brake is cooled. The air is conducted onto the wheel brake both by a corresponding profile of respective regions of the slats and/or by a deflecting blade that can be provided.

The invention also relates to a production method for the air-guiding device. The production method may include an injection molding method, with any other technically suitable production method, such as, for example, pressing or milling, likewise being conceivable.

The features mentioned above can be used in the respectively stated combination and in different combinations or on their own without departing from the scope of the invention.

DETAILED DESCRIPTION

Figure 1:
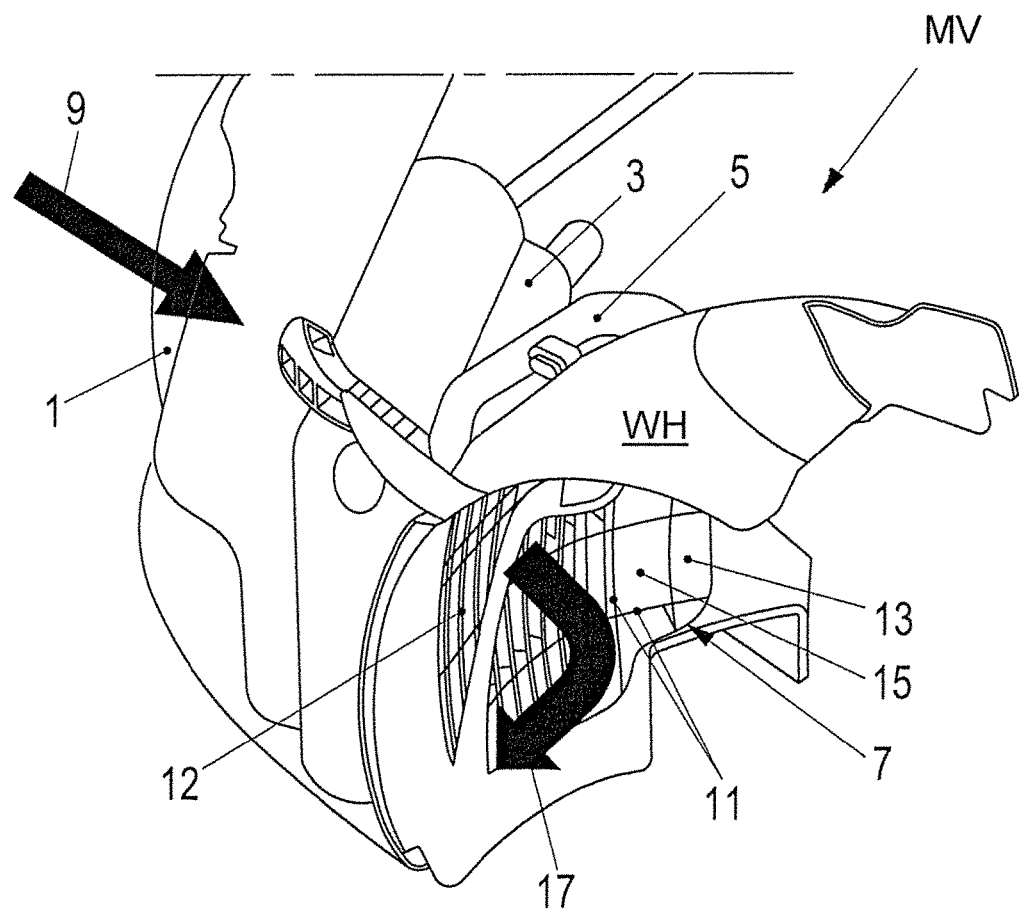
FIG. 1 is a schematic illustration of one possible configuration of the air-guiding device according to the invention in a vehicle.

The arrangement illustrated in FIG. 1 shows an air duct in a motor vehicle MV. The air duct has an air inlet 1, a fan 3 connected to a heat exchanger 5, and an air-guiding device 7 according to an embodiment of the invention. Cold air (illustrated by arrow 9) flows in during a journey and passes through the air inlet 1 to the heat exchanger 5. The cold inflowing air absorbs heat radiated from the heat exchanger 5 and subsequently is blown by the fan 3 in the direction of the air-guiding device 7, which is at the front of the wheel house WH.

The air-guiding device 7 comprises slats 12 configured so that the angle of attack varies over the height of the slats 12. The distances of the slats 12 from one another also varies, as a result of which flow windows 13, 15 of differing size are formed. Accordingly, the air-guiding device 7 comprises regions having flow windows 13 of greater area and flow windows 15 of smaller area.

The size of the flow windows 13 is selected so that the flow windows are optimized in a manner corresponding to the properties of the arriving air stream blown by the fan 3 onto the air-guiding device 7. Acceleration produced by the fan causes the arriving air stream to include turbulent and linear flows. The linear flows are conducted away by the flow windows 15 of smaller area and the turbulent flows are conducted away by the flow windows 13 of larger area.

The profile of the respective regions 11 of the slats 12 differs because of different shapings and because of different angles of attack. These different profiles contribute to the formation of the flow windows 13, 15. For example, profiles with gentle angles of attack can efficiently conduct away arriving linear flows, whereas turbulent flows would break at a flat profile and would thereby be conducted away inefficiently. The position and configuration of the flow windows 13, 15 therefore are selected depending on the flow characteristics of the air stream. The flow characteristics are determined, in turn, by both the configuration of the air duct and the arrangement, direction of rotation and rotational speed of the fan 3. These circumstances make it possible to determine the prevailing flow characteristics in advance and to use the flow characteristics to define a configuration and orientation of the slats 12.

The air-guiding device 7 is designed so that an outlet of the air stream onto a wheel (not illustrated) that is located behind the air-guiding device 7 and rotates during a journey is reduced by the emerging air stream being conducted away laterally directly past the respective wheel, as illustrated by the arrow 17.

Conducting away the emerging air stream past the respective wheel reduces the air stream entrained by the wheel. As a result, a positive pressure within the wheel house surrounding the wheel is reduced. The reduction in the positive pressure in the wheel house surrounding the wheel reduces the aerodynamic drag of the vehicle and reduces a lift that is caused by the positive pressure, thereby having a negative effect on the driving stability of the entire vehicle.

Figure 2:
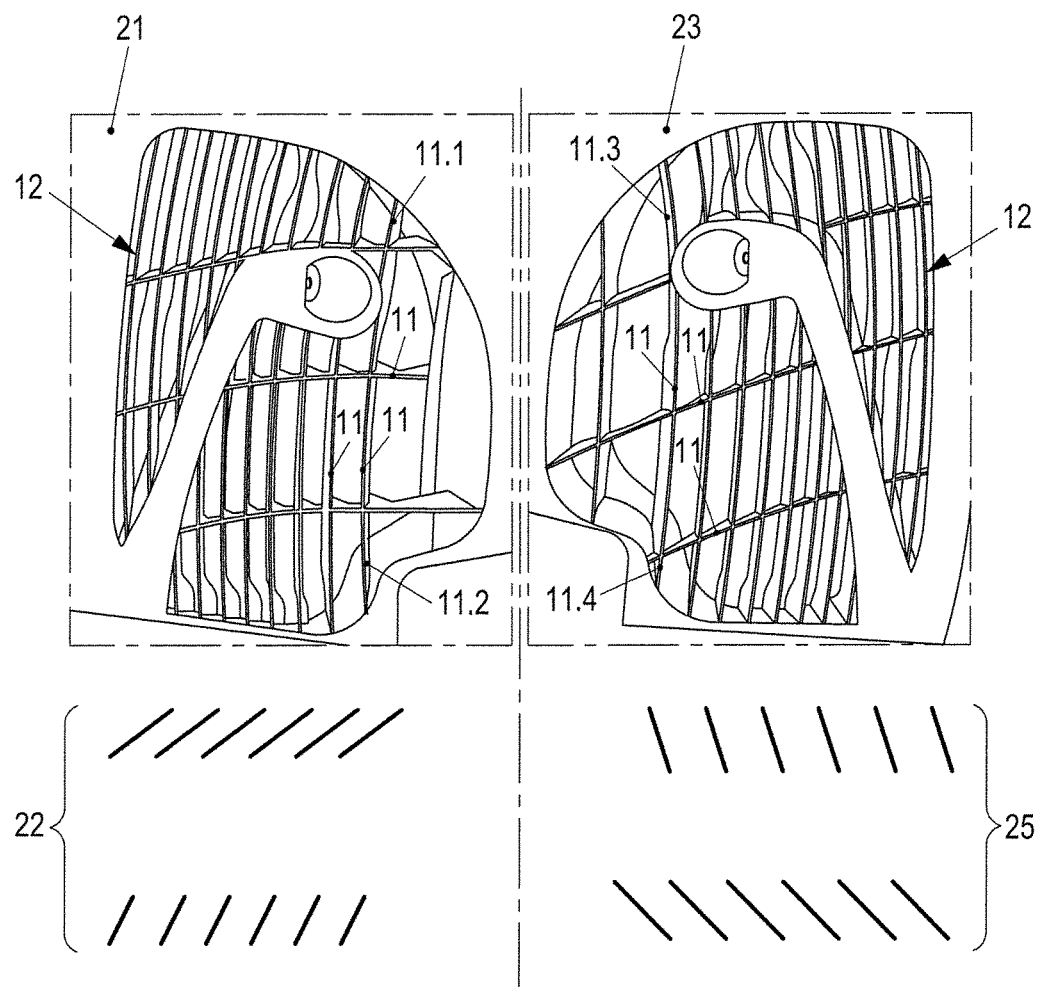
FIG. 2 is a detailed view of slats of a further possible configuration of the air-guiding device according to the invention.

FIG. 2 illustrates two possible configurations of the air-guiding devices 21 and 23 with different profiles of the regions 11 that are surrounded by the slats 12 matched to respective air streams on the left and right in the vehicle. Since respective fans rotate in one direction uniformly both on the right and left in a motor vehicle and are arranged at different positions, the fans cause different flows or flow layers that are discharged efficiently from the vehicle by the configurations 21 and 23.

In configuration 21, the angles of attack of the profiles are gentle in an upper region 11.1 and steep in a lower region 11.2, as clarified by the schematic illustration 22. On the other hand, in configuration 23, an upper region 11.3 is steep and a lower region 11.4 is gentle, as is shown by the schematic illustration 25. It is therefore possible for different directions of flow to be conducted away in each case in the lower regions 11.2, 11.4 than in the upper regions 11.1, 11.3, as a result of which turbulent flows can also be efficiently conducted away. In addition to the variation in the angles of attack, the respective regions 11 vary in shape along the direction of flow in such a manner that the thickness of the respective regions 11, at least partially following the direction of flow of the air stream, runs from thick to thin—in a manner corresponding to an arcuate water drop. The configurations 22 and 23 are matched correspondingly to respective positions of the fans connected to a heat exchanger.

Furthermore, the respective profile of the respective regions 11 of the slats 12 prevents a transfer of possibly occurring particles, such as, for example, dirt, into the interior of the motor vehicle MV.

What is claimed is:

1. An air-guiding device arranged in a wheel house of a motor vehicle, the air-guiding device comprising:
    at least one opening that is at least partially open to the wheel house of the motor vehicle;
    a plurality of slats mounted in the at least one opening, each of the plurality of slats extending in an extending direction transverse to a direction of travel of the motor vehicle and having at least one first region having a first shape and arranged at a first angle to the direction of travel of the motor vehicle and at least one second region adjacent to the at least one first region in the extending direction, the at least one second region having a second shape and arranged at a second angle to the direction of travel of the motor vehicle, the second angle and the second shape being different from the first angle and the first shape; and, wherein
    the first and second angles and first and second shapes are matched to flow conditions of an air stream approaching the at least one first region and at least one second region of each of the plurality of slats to reduce aerodynamic drag of the air stream passing through the respective slats.

2. The air-guiding device of claim 1, wherein the at least one first and at least one second regions are configured with an arcuate or drop-shaped profile with at least one thick end and at least one thin end, and wherein the ends of the at least one first and at least one second regions are oriented in a manner corresponding to the respective flow conditions.

3. The air-guiding device of claim 1, wherein the angle of one of the at least one first and at least one second regions is smaller than the angle of the other of the at least one first and at least one second region.

4. The air-guiding device of claim 1, in which the plurality of slats are disposed and configured so that dirt is prevented from entering the vehicle through the air-guiding device.

5. The air-guiding device of claim 1, further comprising a heat exchanger, wherein the air-guiding device is disposed and configured for discharging an air stream heated by the heat exchanger.

6. The air-guiding device of claim 5, wherein the at least one first and the at least one second regions of each of the plurality of slats differ in the angle and shape thereof depending on a position of the heat exchanger.

7. The air-guiding device of claim 1, wherein the arrangement of the at least one first and the at least one second regions of each of the plurality of slats differ in the angle and shape thereof depending on a shape of the wheel house.

8. An air-guiding device for a motor vehicle having left and right front wheel houses, the air-guiding device comprising:
    a first opening that is at least partially open to the left front wheel house of the motor vehicle;
    a first plurality of slats mounted in the first opening, each of the first plurality of slats extending in an extending direction transverse to a direction of travel of the motor vehicle and having at least one first region arranged at a first angle to the direction of travel of the motor vehicle and having a first shape, and at least one second region arranged at a second angle to the direction of travel of the motor vehicle and having a second shape, and the first angle and the first shape are different from the second angle and the second shape;
    a second opening that is at least partially open to the right front wheel house of the motor vehicle; and
    a second plurality of slats mounted in the second opening, each of the second plurality of slats extending in the extending direction transverse to the direction of travel of the motor vehicle and having at least one third region arranged at a third angle to the direction of travel of the motor vehicle and having a third shape, and at least one fourth region adjacent to the at least one third region in the extending direction, the at least one fourth region arranged at a fourth angle to the direction of travel of the motor vehicle and having a fourth shape, and the third angle and the third shape being different from the fourth angle and the fourth shape, wherein
the angles and shapes of the first plurality of slats being different from the angles and shapes of the second plurality of slats in view of different flow conditions of air streams approaching the first and second openings to reduce aerodynamic drag of the air stream passing through the respective slats.

* * * * *